United States Patent
Morita

(10) Patent No.: US 10,672,558 B2
(45) Date of Patent: Jun. 2, 2020

(54) MULTILAYER CERAMIC CAPACITOR

(71) Applicant: TAIYO YUDEN CO., LTD., Chuo-ku, Tokyo (JP)

(72) Inventor: Koichiro Morita, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/892,285

(22) Filed: Feb. 8, 2018

(65) Prior Publication Data
US 2018/0240592 A1    Aug. 23, 2018

(30) Foreign Application Priority Data
Feb. 21, 2017    (JP) .................. 2017-029615

(51) Int. Cl.
| | | |
|---|---|---|
| H01G 4/30 | (2006.01) | |
| H01G 4/002 | (2006.01) | |
| H01G 4/12 | (2006.01) | |
| H01G 4/232 | (2006.01) | |
| H01G 4/224 | (2006.01) | |
| H01G 4/248 | (2006.01) | |
| H01G 4/012 | (2006.01) | |

(52) U.S. Cl.
CPC ............ H01G 4/002 (2013.01); H01G 4/12 (2013.01); H01G 4/1227 (2013.01); H01G 4/224 (2013.01); H01G 4/232 (2013.01); H01G 4/30 (2013.01); *H01G 4/012* (2013.01); *H01G 4/248* (2013.01)

(58) Field of Classification Search
CPC .......... H01G 4/012; H01G 4/005; H01G 4/12; H01G 4/30; H01G 4/1227; H01G 4/248; H01G 4/232; H01G 4/228
See application file for complete search history.

(56) References Cited

U.S. PATENT DOCUMENTS

| | | | |
|---|---|---|---|
| 2008/0080120 A1* | 4/2008 | Togashi | H01G 4/012 361/301.4 |
| 2011/0141655 A1 | 6/2011 | Jeong et al. | |

(Continued)

FOREIGN PATENT DOCUMENTS

| | | |
|---|---|---|
| JP | H04266006 A | 9/1992 |
| JP | H11354370 A | 12/1999 |

(Continued)

*Primary Examiner* — Nguyen T Ha

(74) *Attorney, Agent, or Firm* — Law Office of Katsuhiro Arai

(57) ABSTRACT

A multilayer ceramic capacitor includes: a multilayer structure in which each of ceramic dielectric layers and each of internal electrode layers are alternately stacked, the plurality of internal electrode layers being alternately exposed to a first edge face and a second edge face of the multilayer structure, wherein: a region in which a set of internal electrode layers exposed to the first edge face of the multilayer structure face with another set of internal electrode layers exposed to the second edge face of the multilayer structure is a capacity region; at least a part of the circumference region around the capacity region has a protective region of which an average grain diameter of a main component ceramic is larger than that of the capacity region and of which a concentration of a donor element in the main component ceramic is larger than that of the capacity region.

12 Claims, 8 Drawing Sheets

(56) References Cited

U.S. PATENT DOCUMENTS

| | | | |
|---|---|---|---|
| 2012/0007709 A1* | 1/2012 | Taniguchi | H01G 4/005 336/200 |
| 2012/0073129 A1* | 3/2012 | Abe | H01G 4/08 29/825 |
| 2012/0147522 A1 | 6/2012 | Kim et al. | |
| 2012/0233828 A1 | 9/2012 | Matsui et al. | |
| 2012/0313489 A1* | 12/2012 | Shirakawa | H01G 4/30 310/365 |
| 2013/0128411 A1 | 5/2013 | Tahara | |
| 2013/0250480 A1* | 9/2013 | Ahn | H01G 4/129 361/321.2 |
| 2013/0279072 A1* | 10/2013 | Okamoto | H01G 4/30 361/301.4 |
| 2014/0345926 A1* | 11/2014 | Lee | H01G 4/30 174/260 |
| 2015/0116896 A1* | 4/2015 | Inazuka | H01G 4/1227 361/301.4 |
| 2015/0348712 A1* | 12/2015 | Lee | H01G 4/30 174/260 |
| 2016/0020031 A1* | 1/2016 | Shin | H01G 4/38 174/260 |
| 2016/0086733 A1 | 3/2016 | Saito et al. | |
| 2016/0217924 A1* | 7/2016 | Morita | C04B 35/4682 |
| 2016/0284471 A1* | 9/2016 | Mizuno | H01G 4/0085 |
| 2017/0018363 A1* | 1/2017 | Tanaka | H01G 4/30 |
| 2017/0309402 A1* | 10/2017 | Yamashita | H01C 7/008 |

FOREIGN PATENT DOCUMENTS

| | | | | |
|---|---|---|---|---|
| JP | 2011124530 A | 6/2011 | | |
| JP | 2012129506 A | 7/2012 | | |
| JP | 2012209538 A | 10/2012 | | |
| JP | 2012248622 A | 12/2012 | | |
| JP | 2015-29158 | * | 2/2015 | H01G 4/12 |
| JP | 2015029158 A | 2/2015 | | |
| JP | 2016066783 A | 4/2016 | | |
| JP | 2016162868 A | 9/2016 | | |

* cited by examiner

FIG. 8

| | | PROTECTIVE LAYER | | | CAPACITY REGION | | | NUMBER OF DEFECTIVE SAMPLES |
|---|---|---|---|---|---|---|---|---|
| | DONOR | TOTAL AMOUNT OF DONOR (atm%) | GRAIN DIAMETER (nm) | THICKNESS (μm) | TOTAL AMOUNT OF DONOR (atm%) | GRAIN DIAMETER (nm) | THICKNESS (μm) | |
| EXAMPLE 1 | Mo | 0.5 | 660 | 5.0 | 0.05 | 240 | 0.6 | 0 |
| EXAMPLE 2 | Mo | 0.5 | 450 | 5.0 | 0.05 | 240 | 0.6 | 1 |
| EXAMPLE 3 | V | 0.5 | 1210 | 5.0 | 0.05 | 240 | 0.6 | 0 |
| EXAMPLE 4 | Nb | 0.5 | 830 | 5.0 | 0.05 | 240 | 0.6 | 0 |
| EXAMPLE 5 | La | 0.5 | 570 | 5.0 | 0.05 | 240 | 0.6 | 0 |
| EXAMPLE 6 | Mo & V | 0.5 | 1160 | 5.0 | 0.05 | 240 | 0.6 | 0 |
| EXAMPLE 7 | V & La | 0.5 | 960 | 5.0 | 0.05 | 240 | 0.6 | 0 |
| EXAMPLE 8 | Mo | 0.2 | 590 | 5.0 | 0.05 | 240 | 0.6 | 0 |
| EXAMPLE 9 | Mo | 0.1 | 520 | 5.0 | 0.05 | 240 | 0.6 | 3 |
| EXAMPLE 10 | Mo | 0.2 | 650 | 5.0 | 0.1 | 240 | 0.6 | 0 |
| EXAMPLE 11 | Mo | 0.5 | 700 | 5.0 | 0.2 | 240 | 0.6 | 0 |
| EXAMPLE 12 | Mo | 0.5 | 680 | 2.0 | 0.05 | 240 | 0.6 | 1 |
| EXAMPLE 13 | Mo | 0.5 | 670 | 1.0 | 0.05 | 240 | 0.6 | 2 |
| COMPARATIVE EXAMPLE 1 | Mo | 0.5 | 200 | 5.0 | 0.05 | 240 | 0.6 | 9 |
| COMPARATIVE EXAMPLE 2 | — | 0 | 510 | 5.0 | 0.05 | 240 | 0.6 | 88 |
| COMPARATIVE EXAMPLE 3 | — | 0 | 200 | 5.0 | 0.05 | 240 | 0.6 | 217 |
| COMPARATIVE EXAMPLE 4 | Mo | 0.2 | 680 | 5.0 | 0.2 | 240 | 0.6 | 5 |

MULTILAYER CERAMIC CAPACITOR

CROSS-REFERENCE TO RELATED APPLICATION

This application is based upon and claims the benefit of priority of the prior Japanese Patent Application No. 2017-029615, filed on Feb. 21, 2017, the entire contents of which are incorporated herein by reference.

FIELD

A certain aspect of the present invention relates to a multilayer ceramic capacitor.

BACKGROUND

A multilayer ceramic capacitor has a multilayer structure in which dielectric layers and internal electrode layers are alternately stacked, and a pair of external electrodes that are formed on a surface of the multilayer structure and are electrically coupled to the internal electrodes that are extracted to the surface of the multilayer structure. A hydrogen may enter the multilayer structure in a plating process of the external electrodes or in a high temperature and high humidity condition. This causes proton conduction. And, degradation of insulating property may occur in the multilayer ceramic capacitor.

And so, there is disclosed a technology for suppressing hydrogen intrusion from an external electrode in a plating process (for example, see Japanese Patent Application Publication No. 2016-66783). There is disclosed a technology in which intrusion of water is suppressed by enlarging Si concentration of a margin region (for example, see Japanese Patent Application Publication No. 2015-29158). There is disclosed a technology in which intrusion of water is suppressed by covering a surface with sol-gel glass (for example, see Japanese Patent Application Publication No. H04-266006).

SUMMARY OF THE INVENTION

However, with the above-mentioned technologies, it is difficult to suppress diffusion intrusion of a hydrogen in a shape of a proton.

The present invention has a purpose of providing a multilayer ceramic capacitor that is capable of suppressing diffusion intrusion of a hydrogen in a shape of a proton.

According to an aspect of the present invention, there is provided a multilayer ceramic capacitor including: a multilayer structure in which each of a plurality of ceramic dielectric layers and each of a plurality of internal electrode layers are alternately stacked, a main component of the dielectric layer being ceramic, the multilayer structure having a rectangular parallelepiped shape, the plurality of internal electrode layers being alternately exposed to a first edge face and a second edge face of the multilayer structure, the first edge face facing with the second edge face, wherein: a region in which a set of internal electrode layers exposed to the first edge face of the multilayer structure face with another set of internal electrode layers exposed to the second edge face of the multilayer structure is a capacity region; in the capacity region, a circumference region is a region around the capacity region; at least a part of the circumference region has a protective region of which an average grain diameter of a main component ceramic is larger than that of the capacity region and of which a concentration of a donor element in the main component ceramic is larger than that of the capacity region.

BRIEF DESCRIPTION OF THE DRAWINGS

FIG. 8 illustrates examples and comparative examples.

DETAILED DESCRIPTION

A description will be given of an embodiment with reference to the accompanying drawings.

Embodiment

Figure 1:
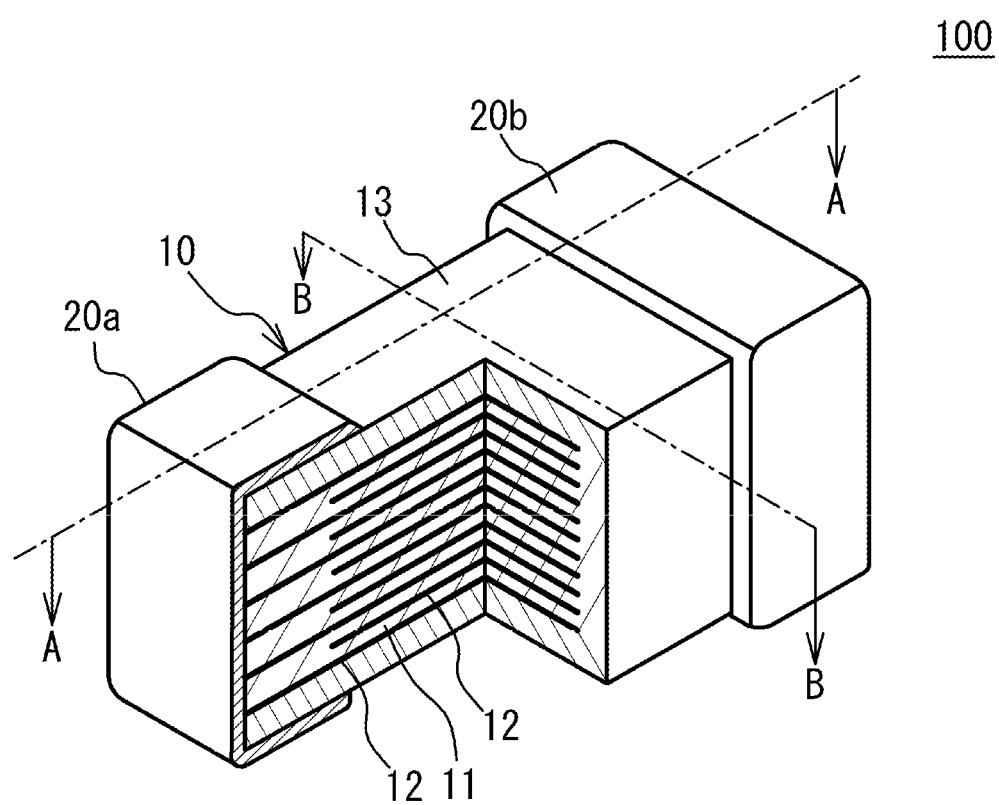
FIG. 1 illustrates a partial perspective view of a multilayer ceramic capacitor.
Figure 2:
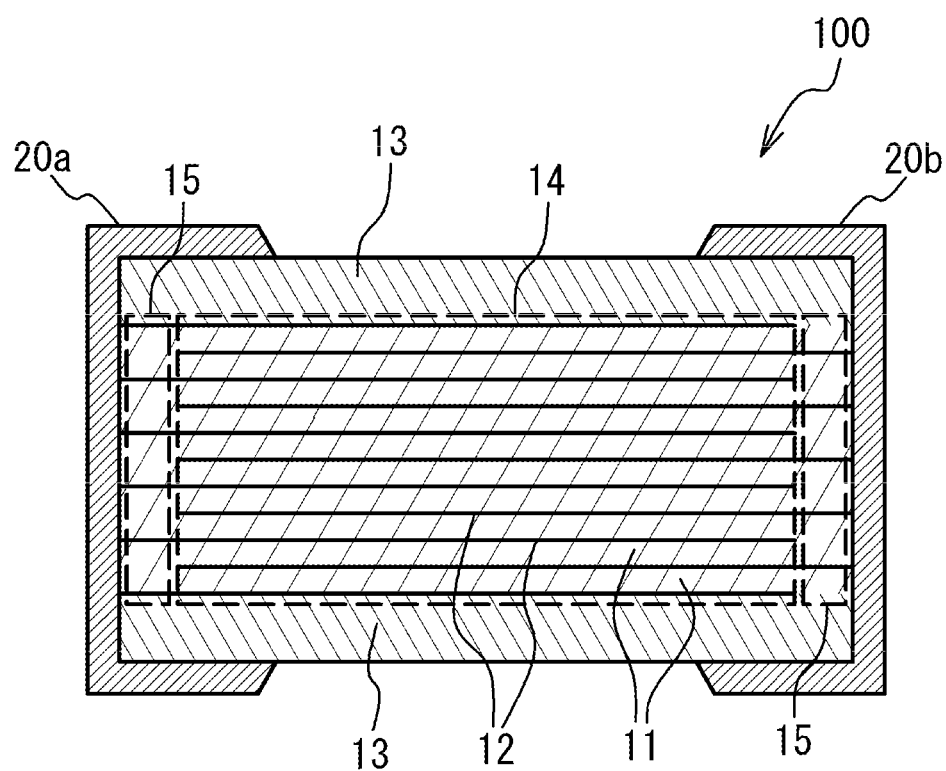
FIG. 2 illustrates a cross sectional view taken along a line A-A of FIG. 1.
Figure 3:
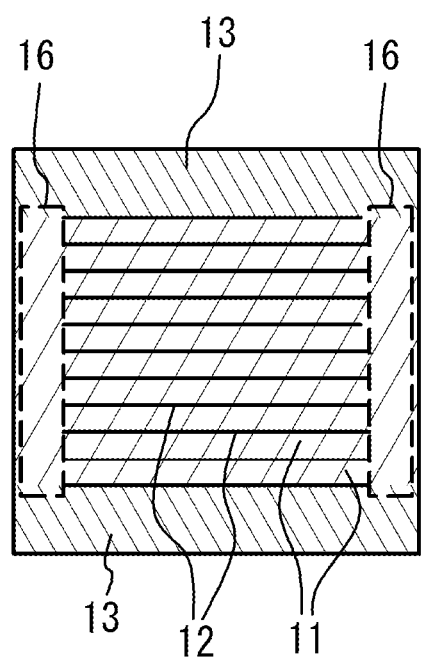
FIG. 3 illustrates a cross sectional view taken along a line B-B of FIG. 2.

FIG. 1 illustrates a partial perspective view of a multilayer ceramic capacitor 100 in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. In four faces other than the two edge faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, the internal electrode layer 12 is positioned at an outermost layer. The upper face and the lower face of the multilayer chip 10 that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.2 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

As illustrated in FIG. 2, a region, in which a set of the internal electrode layers 12 connected to the external electrode 20a face another set of the internal electrode layers 12 connected to the external electrode 20b, is a region generating electrical capacitance in the multilayer ceramic capacitor 100. And so, the region is referred to as a capacity region 14. That is, the capacity region 14 is a region in which the internal electrode layers 12 next to each other are connected to different external electrodes face each other.

A region, in which the internal electrode layers 12 connected to the external electrode 20a face with each other without sandwiching the internal electrode layer 12 connected to the external electrode 20b, is referred to as an end margin 15. A region, in which the internal electrode layers 12 connected to the external electrode 20b face with each other without sandwiching the internal electrode layer 12 connected to the external electrode 20a is another end margin 15. That is, the end margin 15 is a region in which a set of the internal electrode layers 12 connected to one external electrode face with each other without sandwiching the internal electrode layer 12 connected to the other external electrode. The end margin 15 is a region that does not generate electrical capacitance in the multilayer ceramic capacitor 100.

As illustrated in FIG. 3, a region of the multilayer chip 10 from the two sides thereof to the internal electrode layers 12 is referred to as a side margin 16. That is, the side margin 16 is a region covering edges of the stacked internal electrode layers 12 in the extension direction toward the two side faces. The cover layer 13, the end margin 15 and the side margin 16 are also referred to as a circumference region of the capacity region 14.

In the multilayer ceramic capacitor 100, a hydrogen may enter the capacity region 14 in a shape of a proton by diffusion intrusion, in a plating process of the external electrodes 20a and 20b, in a high temperature and high humidity condition such in a car or the like, or in a normal atmosphere including various components. In concrete, the proton enters the capacity region 14 by grain boundary diffusion or enters the capacity region 14 in a shape of water acid through the oxygen defect.

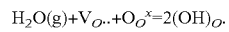

$H_2O(g) + V_{O^{..}} + O_O^x = 2(OH)_O^.$

Figure 4A:
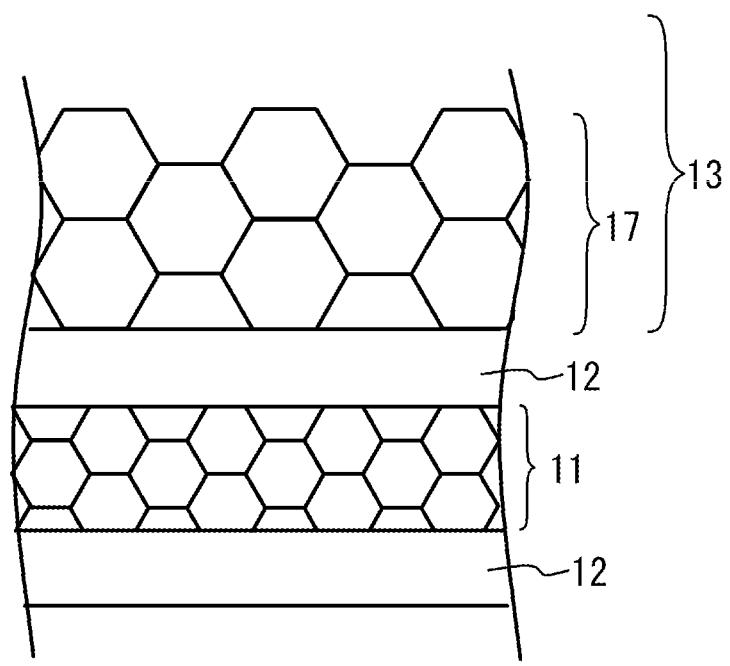
FIG. 4A and FIG. 4B illustrate a protective region of a cover layer.

And so, in the embodiment, the number of grain boundaries of the cover layer 13 is smaller than that of the dielectric layer 11 in the capacity region 14, as illustrated in FIG. 4A. In concrete, an average grain diameter of the main component ceramic of the cover layer 13 is larger than that of the dielectric layer 11 in the capacity region 14. With the structure, the number of paths for the diffusion intrusion of the proton in the cover layer 13 becomes smaller, and the grain boundary diffusion is suppressed. It is therefore possible to suppress the diffusion intrusion of the hydrogen in the shape of the proton. From a viewpoint of sufficient suppression of the proton diffusion intrusion, it is preferable that the average grain diameter of the main component ceramic of the cover layer 13 is twice or more than that of the dielectric layer 11 in the capacity region 14. For example, the average grain diameter of the main component ceramic of the dielectric layer 11 in the capacity region 14 is 300 nm or less. A thickness of the dielectric layer 11 is, for example, 1 μm or less. The grain diameters are Feret diameters that are measured by adjusting a scale factor so that a single image of a scanning electron microscope or a transmission electron microscope includes 80 to 150 crystal grains, capturing a plurality of images so that a total number of the crystal grains is 400 or more, and measuring all Feret diameters of all of the crystal grains on the images. The average grain diameter is an average of the Feret diameters.

Moreover, a concentration of a donor element in the main component ceramic of the cover layer 13 is larger than that of the dielectric layer 11 in the capacity region 14. The donor element is an element that can be replaced with an A site of the perovskite $ABO_3$ and can become ion of which valence is three (a part of rare earth elements such as Y (yttrium), La (lanthanum), Sm (samarium), Gd (gadolinium), Dy (dysprosium) or Ho (Holmium)) or an element that can be replaced with a B site of the perovskite $ABO_3$ and can become ion of which valence is five or more (a part of transition metals such as V (vanadium), Mo (molybdenum), Nb (niobium), W (tungsten) or Ta (tantalum)). For example, when the main component ceramic of the cover layer 13 and the main component ceramic of the dielectric layer 11 in the capacity region 14 have a perovskite structure, V, Mo, Nb, La, W, Ta or the like can be used as the donor element. When the concentration of the donor element is high, generation of an oxygen defect can be suppressed. Thereby, diffusion intrusion of a proton is suppressed. For example, from a viewpoint of a sufficient effect of the donor element, it is preferable that the concentration of the donor element in the main component ceramic of the cover layer 13 is 0.2 atm % or more. It is more preferable that the concentration of the donor element in the main component ceramic of the cover layer 13 is 0.5 atm % or more. From a viewpoint of suppression of degradation of the insulating property, it is preferable that the concentration of the donor element in the main component of the dielectric layer 11 in the capacity region 14 is 0.2 atm % or less. It is more preferable that the concentration of the donor element in the main component of the dielectric layer 11 in the capacity region 14 is 0.1 atm % or less.

A region, in which the average grain diameter of the main component ceramic is larger than that of the dielectric layer 11 in the capacity region 14 and the concentration of the donor element in the main component ceramic is larger than that of the dielectric layer 11 in the capacity region 14, is referred to as a protective region 17.

Figure 4B:
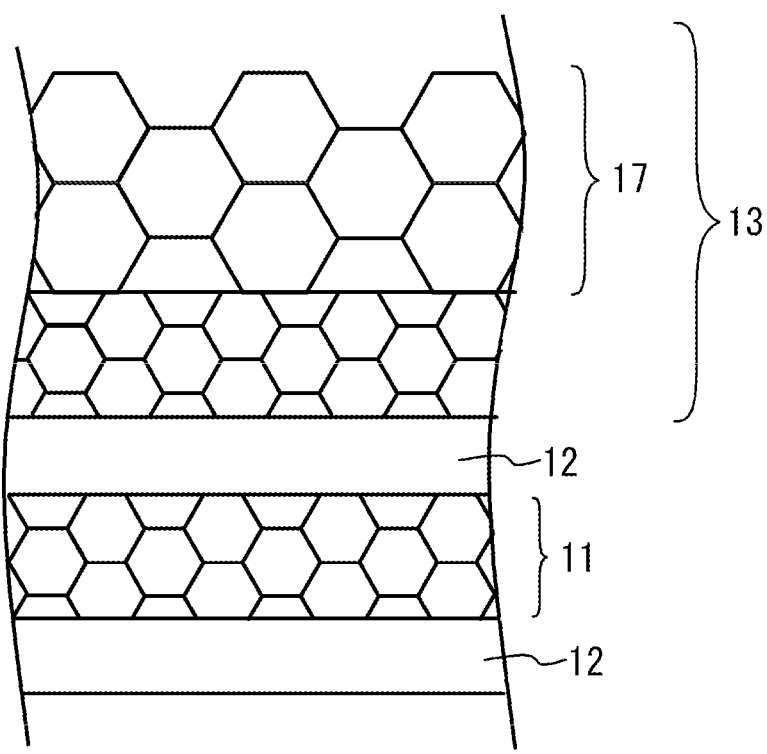

A whole of the cover layer 13 may be the protective region 17. A part of the cover layer 13 may be the protective region 17. For example, as illustrated in FIG. 4B, in the cover layer 13, a region of which an average grain diameter is small may be provided in the cover layer 13 on the capacity region 14 side with respect to the protective region 17. Alternatively, a region of which an average grain diameter is small may be provided in the cover layer 13 on the opposite side of the capacity region 14. When the protective region 17 is a part of the cover layer 13, it is preferable that the protective region 17 has a layer structure having an area covering an upper face or a lower face of the capacity region 14. From a viewpoint of suppression of the diffusion intrusion of the proton, it is preferable that the protective region 17 has a thickness of 2.0 µm or more in the stacking direction of the multilayer chip 10. It is more preferable that the protective region 17 has a thickness of 5.0 µm or more in the stacking direction of the multilayer chip 10.

Figure 5A:
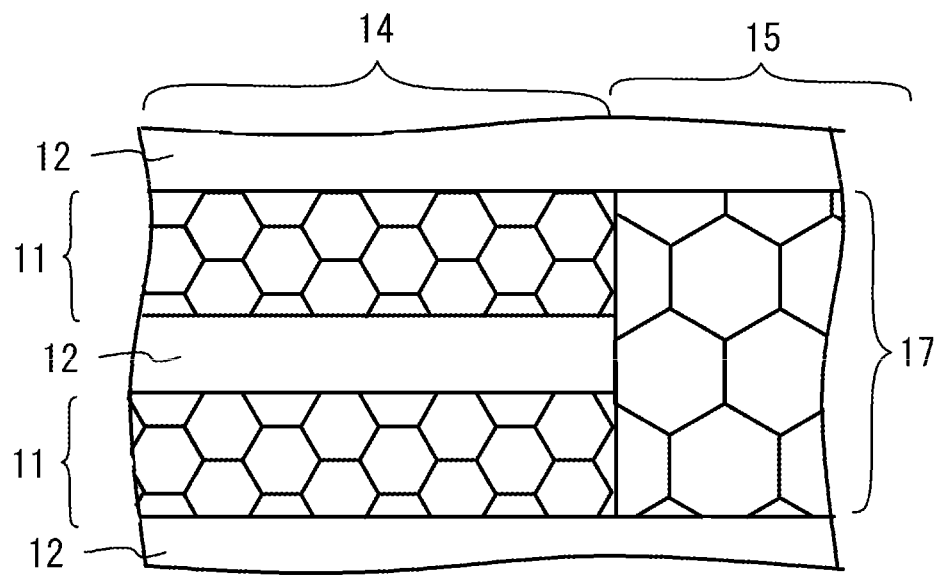
FIG. 5A and FIG. 5B illustrate a protective region of an end margin.
Figure 5B:
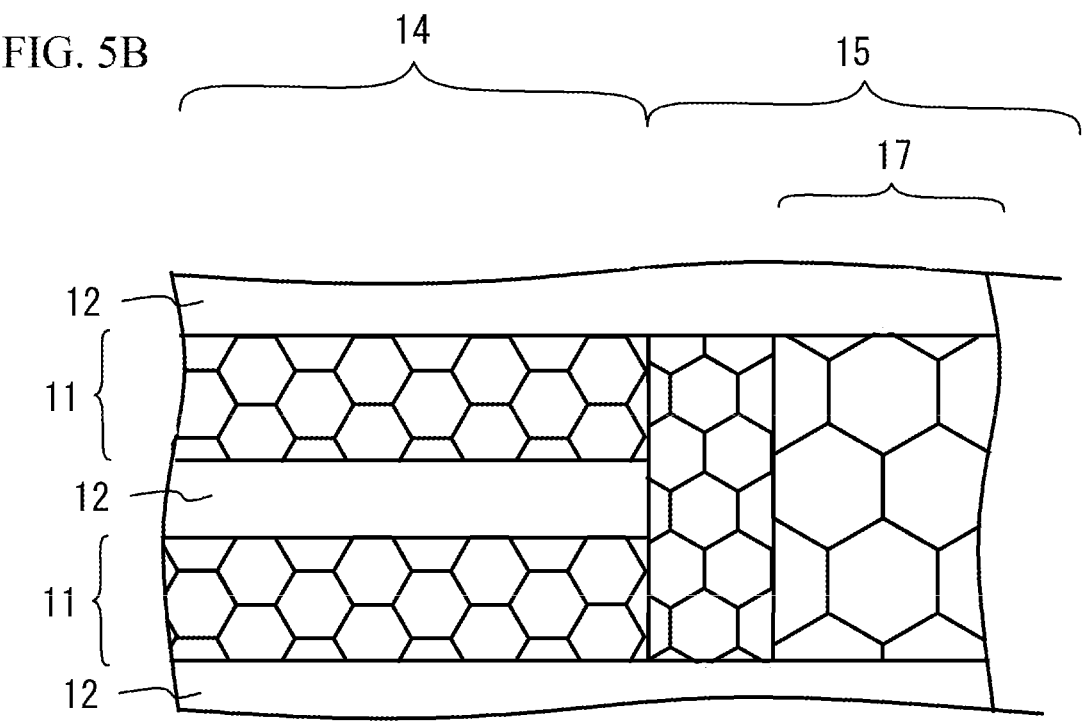

The protective region 17 may be provided in the end margin 15. In this case, as illustrated in FIG. 5A, a whole of the dielectric layer 11 in the end margin 15 may be the protective region 17. A part of the dielectric layer 11 in the end margin 15 may be the protective region 17. For example, as illustrated in FIG. 5B, in the end margin 15, a region of which an average grain diameter is small may be provided in the end margin 15 on the capacity region 14 side with respect to the protective region 17. Alternatively, a region of which an average grain diameter is small may be provided in the end margin 15 on the opposite side of the capacity region 14. When the protective region 17 is a part of the end margin 15, it is preferable that the protective region 17 has a layer structure having an area covering an edge of the capacity region 14 on the side of the edge face of the multilayer chip 10. From a viewpoint of suppression of the diffusion intrusion of the proton, it is preferable that the protective region 17 has a thickness of 2.0 µm or more in a direction from the external electrodes 20a and 20b to the capacity region 14. It is more preferable that the protective region 17 has a thickness of 5.0 µm or more in the direction.

Figure 6A:
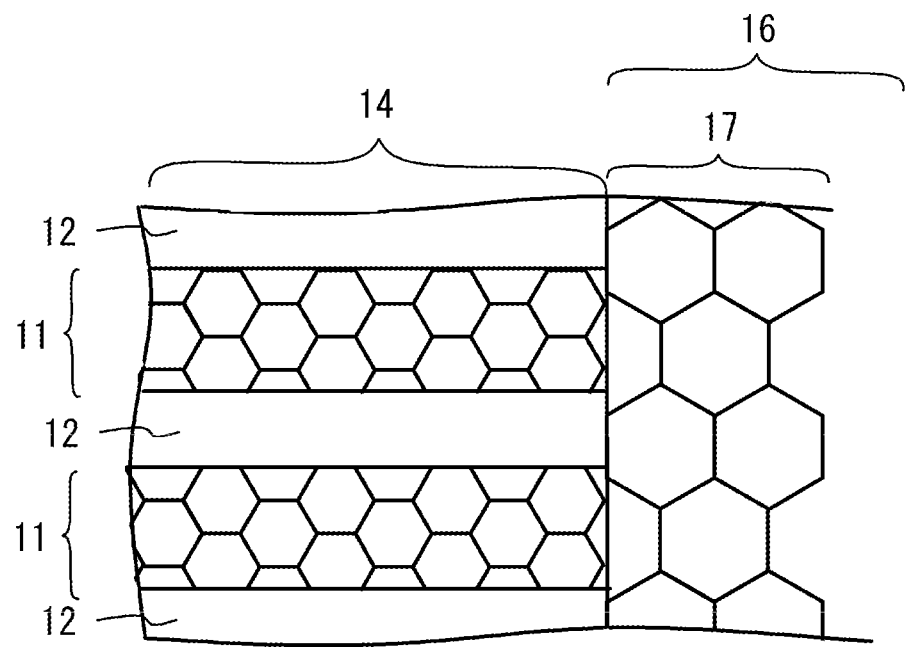
FIG. 6A and FIG. 6B illustrate a protective region of a side margin.
Figure 6B:
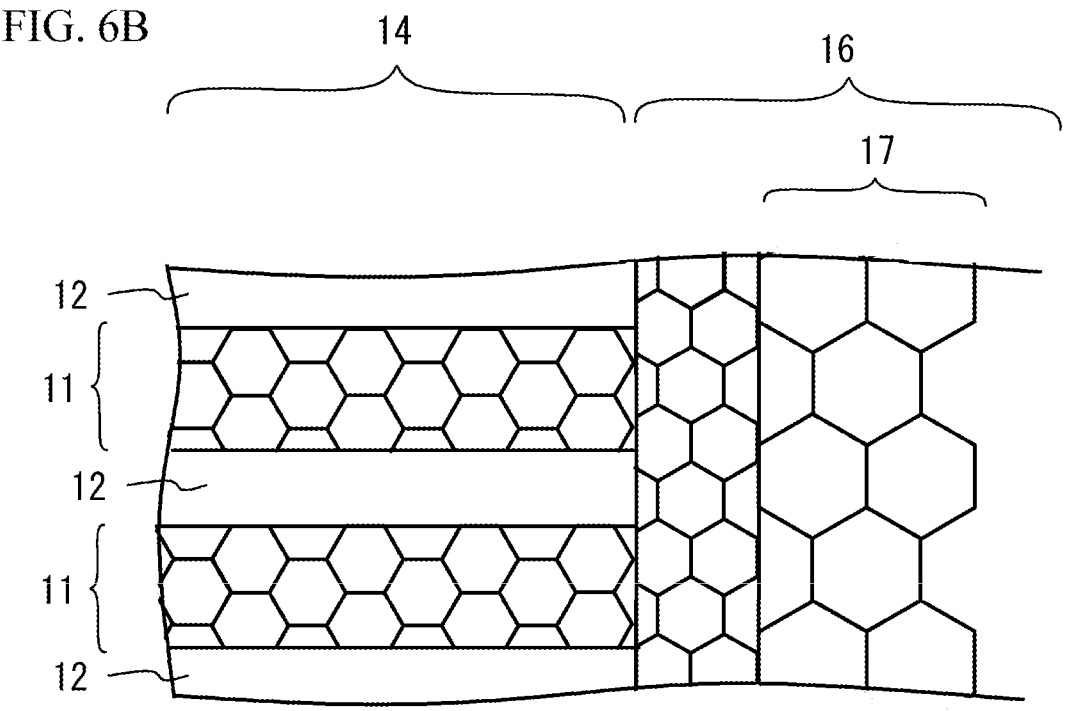

The protective region 17 may be provided in the side margin 16. In this case, as illustrated in FIG. 6A, a whole of the side margin 16 may be the protective region 17. A part of the side margin 16 may be the protective region 17. For example, as illustrated in FIG. 6B, in the side margin 16, a region of which an average grain diameter is small may be provided in the side margin 16 on the capacity region 14 side with respect to the protective region 17. Alternatively, a region of which an average grain diameter is small may be provided in the side margin 16 on the opposite side of the capacity region 14. When the protective region 17 is a part of the side margin 16, it is preferable that the protective region 17 has a layer structure having an area covering an edge of the capacity region 14 on the side of the side face of the multilayer chip 10. From a viewpoint of suppression of the diffusion intrusion of the proton, it is preferable that the protective region 17 has a thickness of 2.0 µm or more in a direction from the side face of the multilayer chip 10 to the capacity region 14. It is more preferable that the protective region 17 has a thickness of 5.0 µm or more in the direction.

Figure 7:
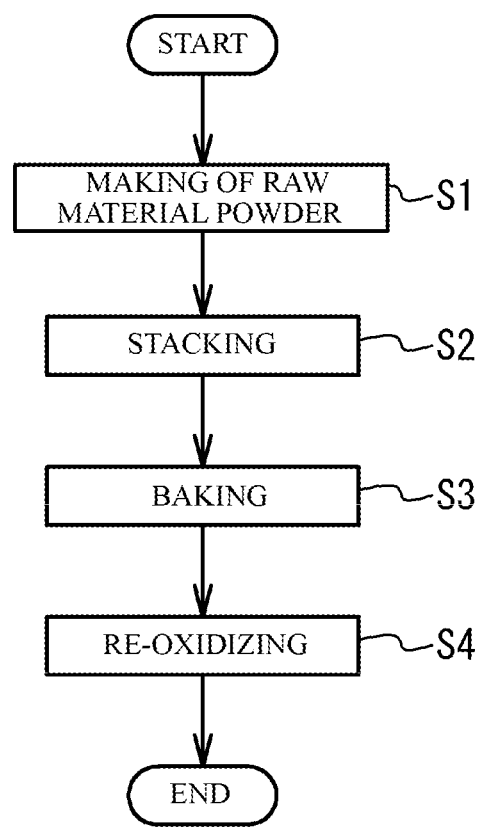
FIG. 7 illustrates a flow of a manufacturing method of a multilayer ceramic.

Next, a description will be given of a manufacturing method of the multilayer ceramic capacitor 100. FIG. 7 illustrates a manufacturing method of the multilayer ceramic capacitor 100. A description will be given of a manufacturing method for forming the protective region 17 in the cover layer 13.

(Making process of a raw material powder) Additive compound may be added to a ceramic material powder that is a main component of the dielectric layer 11, in accordance with purposes. The additive compound may be an oxide of Mg (magnesium), Mn (manganese), V, Cr (chromium) or a rare earth element (Y, Dy, Tm (thulium), Ho (holmium), Tb (terbium), Yb (ytterbium), Sm, Eu (europium), Gd and Er (erbium)), or an oxide of Co (cobalt), Ni, Li (lithium), B (boron), Na (sodium), K (potassium) and Si (silicon), or glass. For example, compound including additive compound is added to a ceramic material powder and is calcined. Next, the resulting ceramic material grains are wet-blended with additive compound, is dried and is crushed. Thus, the ceramic material powder is prepared.

(Stacking Process) Next, a binder such as polyvinyl butyral (PVB) resin, an organic solvent such as ethanol or toluene, and a plasticizer such as dioctyl phthalate (DOP) are added to the resulting ceramic material powder and wet-blended. With use of the resulting slurry, a strip-shaped dielectric green sheet with a thickness of 0.8 µm or less is coated on a base material by, for example, a die coater method or a doctor blade method, and then dried.

Then, a pattern of the internal electrode layer 12 is provided on the surface of the dielectric green sheet by printing a conductive paste for forming the internal electrode with use of screen printing or gravure printing. The conductive paste includes powder of the main component metal of the internal electrode layer 12, a binder, a solvent, and additives as needed. It is preferable that the binder and the solvent are different from those of the above-mentioned ceramic slurry. As a co-material, the ceramic material that is the main component of the dielectric layer 11 may be distributed in the conductive paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations.

Cover sheets, which are to be the cover layers 13, are compressed on the stacked green sheets and under the stacked sheets. The resulting compact is cut into a predetermined size (for example, 1.0 mm×0.5 mm). Thus, a ceramic multilayer structure having a rectangular parallelepiped shape is obtained. The average grain diameter of the main component ceramic of the cover sheet is larger than that of the dielectric green sheet. The concentration of the donor element in the main component ceramic of the cover sheet is higher than that of the dielectric green sheet.

(Baking process) Next, after removing the binder in $N_2$ atmosphere at 250 degrees C. to 500 degrees C., the resulting ceramic multilayer structure is baked for ten minutes to 2 hours in a reductive atmosphere in a temperature range of 1100 degrees C. to 1300 degrees C. Thus, each compound structuring the dielectric green sheet is sintered. In this manner, a sintered structure having the multilayer chip 10 having the multilayer structure in which the sintered dielectric layers 11 and the sintered internal electrode layers 12 are alternately stacked and having the cover layers 13 formed as outermost layers of the multilayer chip 10 in the stack direction is obtained.

(Re-oxidizing process) After that, a re-oxidizing process may be performed at 600 degrees C. to 1000 degrees C. in $N_2$ gas atmosphere.

With the manufacturing method, it is possible to form the protective region 17 in the cover layer 13.

First Modified Embodiment

Next, a description will be given of a manufacturing method for forming the protective region 17 in the end margin 15. The manufacturing method is different from the above-mentioned method only in the stacking process. Therefore, a description will be given of the different point. A binder such as polyvinyl butyral (PVB) resin, an organic solvent such as ethanol or toluene, and a plasticizer such as dioctyl phthalate (DOP) are added to the resulting ceramic material powder and wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing a conductive paste for forming the internal electrode with use of screen printing or gravure printing. The conductive paste includes a powder of the main component metal of the internal electrode layer 12, a binder, a solvent, and additives as needed. It is preferable that the binder and the solvent are different from those of the above-mentioned ceramic slurry. As a co-material, the ceramic material that is the main component of the dielectric layer 11 may be distributed in the conductive paste.

A margin paste is printed on a circumference region of the dielectric green sheet on which the metal conductive paste is not printed. The average grain diameter of the main component ceramic in the margin paste is larger than that of the dielectric green sheet. And, the concentration of the donor element in the main component ceramic of the margin paste is larger than that of the dielectric green sheet. With the processes, pattern sheets are formed.

Then, the pattern sheet is stamped into a predetermined size, and a predetermined number (for example, 200 to 500) of stamped pattern sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations.

Cover sheets, which are to be the cover layers 13, are compressed on the stacked pattern sheets and under the stacked pattern sheets. The resulting compact is cut into a predetermined size (for example, 1.0 mm×0.5 mm). Thus, a ceramic multilayer structure is obtained.

With the manufacturing method, it is possible to form the protective region 17 in the end margin 15.

Second Modified Embodiment

Next, a description will be given of a manufacturing method for forming the protective region 17 in the side margin 16. A description will be given of the stacking process, as well as the first modified embodiment. A binder such as polyvinyl butyral (PVB) resin, an organic solvent such as ethanol or toluene, and a plasticizer such as dioctyl phthalate (DOP) are added to the resulting ceramic material powder obtained in the making process and wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing a conductive paste for forming the internal electrode with use of screen printing or gravure printing. The conductive paste includes a powder of the main component metal of the internal electrode layer 12, a binder, a solvent, and additives as needed. It is preferable that the binder and the solvent are different from those of the above-mentioned ceramic slurry. As a co-material, the ceramic material that is the main component of the dielectric layer 11 may be distributed in the conductive paste. Next, a margin paste is printed on a region of the dielectric green sheet on which the conductive paste for forming the internal electrode is not printed. Thus, pattern sheets are formed. The average grain diameter of the main component ceramic of the margin paste is larger than that of the dielectric green sheet. And, the concentration of the donor element in the main component ceramic of the margin paste is higher than that of the dielectric green sheet.

Then, the pattern sheet is stamped into a predetermined size, and a predetermined number (for example, 200 to 500) of stamped pattern sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations.

Cover sheets, which are to be the cover layers 13, are compressed on the stacked pattern sheets and under the stacked pattern sheets. The resulting compact is cut into a predetermined size (for example, 1.0 mm×0.5 mm). Thus, a ceramic multilayer structure is obtained.

With the manufacturing method, it is possible to form the protective region 17 in the side margin 16.

EXAMPLES

The multilayer ceramic capacitors 100 in accordance with the embodiment were made. And, property of the multilayer ceramic capacitors 100 was measured.

Example 1

In an example 1, barium titanate was used as the main component ceramic of the dielectric layer 11. Mo was used as the donor element. A donor element source was added to the main component ceramic powder so that a concentration of the donor element was 0.05 atm % on a presumption that a concentration of Ti was 100 atm %. The resulting main component ceramic powder was sufficiently wet-blended and crushed with a ball mil. Thus, the dielectric material was obtained. An organic binder and a solvent were added to the dielectric material. And dielectric green sheets were made by a doctor blade method. The organic binder was polyvinyl butyral (PVB) resin or the like. The solvent was ethanol, toluene or the like. And a plasticizer and so on were added. Next, the conductive paste for forming the internal electrode layer 12 was made by mixing a powder acting as a main component metal of the internal electrode layer 12, a binder, a solvent and an additive as needed. The organic binder and the solvent were different from those of the dielectric green sheet. The conductive paste was screen-printed on the dielectric sheet. 500 of the dielectric green sheets on which the conductive paste for forming the internal electrode layer were stacked. And, a multilayer structure was obtained.

Barium titanate was used as the main component ceramic of the cover layer 13. Mo was used as the donor element. A donor element source was added to the main component ceramic powder so that a concentration of the donor element was 0.5 atm % on a presumption that a concentration of Ti was 100 atm %. The resulting main component ceramic powder was sufficiently wet-blended and crushed with a ball mil. Thus, the dielectric material was obtained. An organic binder and a solvent were added to the dielectric material. And dielectric green sheets were made by a doctor blade method. The organic binder was polyvinyl butyral (PVB) resin or the like. The solvent was ethanol, toluene or the like. And a plasticizer and so on were added. After that, cover sheets were stacked on the multilayer structure and under the multilayer structure. After that, a ceramic multilayer structure was obtained by a thermal compressing. And the ceramic multilayer structure was cut into a predetermined size. The binder was removed from the resulting ceramic multilayer structure in $N_2$ atmosphere. After that, the resulting ceramic multilayer structure was baked, and a sintered structure was obtained. The thickness of the dielectric layer 11 after the baking was 0.6 µm. The average grain diameter of the main component ceramic was 240 nm. The thickness of the protective region 17 after the baking was 5.0 µm. The average grain diameter of the main component ceramic of the protective region 17 after the baking was 660 nm. After that, the re-oxidizing process was performed in $N_2$ atmosphere at a temperature from 600 degrees C. to 1000 degrees C.

Example 2

In an example 2, the average grain diameter of the main component ceramic in the protective region 17 after the baking was 450 nm. Other conditions were the same as those of the example 1.

Example 3

In an example 3, V was used as the donor element. The average grain diameter of the main component ceramic in the protective region 17 after the baking was 1210 nm. Other conditions were the same as those of the example 1.

Example 4

In an example 4, Nb was used as the donor element. The average grain diameter of the main component ceramic in the protective region 17 after the baking was 830 nm. Other conditions were the same as those of the example 1.

Example 5

In an example 5, La was used as the donor element. The average grain diameter of the main component ceramic in the protective region 17 after the baking was 570 nm. Other conditions were the same as those of the example 1.

Example 6

In an example 6, Mo and V were mixed with each other and were used as the donor element. The average grain diameter of the main component ceramic in the protective region 17 after the baking was 1160 nm. Other conditions were the same as those of the example 1.

Example 7

In an example 7, V and La were mixed with each other and were used as the donor element. The average grain diameter of the main component ceramic in the protective region 17 after the baking was 960 nm. Other conditions were the same as those of the example 1.

Example 8

In an example 8, the donor element source was added to the cover sheet so that the concentration of the donor element was 0.2 atm % on a presumption that the concentration of Ti in the main component ceramic was 100 atm %. The average grain diameter of the main component ceramic in the protective region 17 after the baking was 590 nm. Other conditions were the same as those of the example 1.

Example 9

In an example 9, the donor element source was added to the cover sheet so that the concentration of the donor element was 0.1 atm % on a presumption that the concentration of Ti in the main component ceramic was 100 atm %. The average grain diameter of the main component ceramic in the protective region 17 after the baking was 520 nm. Other conditions were the same as those of the example 1.

Example 10

In an example 10, the donor element source was added to the dielectric green sheet so that the concentration of the donor element was 0.1 atm % on a presumption that the concentration of Ti in the main component ceramic powder was 100 atm %. The donor element source was added to the cover sheet so that the concentration of the donor element was 0.2 atm % on a presumption that the concentration of Ti in the main component ceramic was 100 atm %. The average grain diameter of the main component ceramic in the protective region 17 after the baking was 650 nm. Other conditions were the same as those of the example 1.

Example 11

In an example 11, the donor element source was added to the dielectric green sheet so that the concentration of the donor element was 0.2 atm % on a presumption that the concentration of Ti in the main component ceramic powder was 100 atm %. The average grain diameter of the main component ceramic in the protective region 17 after the baking was 700 nm. Other conditions were the same as those of the example 1.

Example 12

In an example 12, the average grain diameter of the main component ceramic in the protective region 17 after the baking was 680 nm. And the thickness of the protective region 17 after the baking was 2.0 µm. Other conditions were the same as those of the example 1.

Example 13

In an example 13, the average grain diameter of the main component ceramic in the protective region 17 after the baking was 670 nm. And the thickness of the protective region 17 after the baking was 1.0 μm. Other conditions were the same as those of the example 1.

Comparative Example 1

In a comparative example 1, the average grain diameter of the main component ceramic in the protective region 17 after the baking was 200 nm. Other conditions were the same as those of the example 1.

Comparative Example 2

In a comparative example 2, the donor element was not added to the cover sheet. The average grain diameter of the main component ceramic in the protective region 17 after the baking was 510 nm. Other conditions were the same as those of the example 1.

Comparative Example 3

In a comparative example 3, the donor element was not added to the cover sheet. The average grain diameter of the main component ceramic in the protective region 17 after the baking was 200 nm. Other conditions were the same as those of the example 1.

Comparative Example 4

In a comparative example 4, the donor element source was added to the dielectric green sheet so that the concentration of the donor element was 0.2 atm % on a presumption that the concentration of Ti in the main component ceramic was 100 atm %. The donor element source was added to the cover sheet so that the concentration of the donor element was 0.2 atm % on a presumption that the concentration of Ti in the main component ceramic was 100 atm %. The average grain diameter of the main component ceramic in the protective region 17 after the baking was 680 nm. Other conditions were the same as those of the example 1.

(Analysis) An accelerated tolerance test of high temperature-moisture resistance was performed with respect to the multilayer ceramic capacitors 100. The number of samples of each of the examples 1 to 13 and the comparative examples 1 to 4 was 300. An initial insulating resistance of each sample was measured. Next, each sample was kept for 1000 hours under a condition that an ambient temperature was 85 degrees C., a relative humidity was 85% RH, a voltage of 20 V/μm was applied. After that, an insulating resistance $R_t$ of each sample was measured. A sample of which the insulating resistance $R_t$ was $0.1 \times R_0$ or less was determined as a defective sample. When the number of the defective sample of an example was three or less with respect to 300 samples, it was determined that the example passed the examination.

As illustrated in FIG. 8, it was determined that the examples 1 to 13 passed the examination. This is because the average grain diameter of the main component ceramic of the protective region 17 was larger than that of the capacity region 14, the donor element concentration in the main component ceramic of the protective region 17 is larger than that of the capacity region 14, and the diffusion intrusion of the hydrogen into the capacity region 14 in a shape of a proton was suppressed.

In the comparative example 1, the number of defective samples was nine that was a large value. This is because the average grain diameter of the protective region 17 was smaller than that of the capacity region 14, and the number of paths for the diffusion intrusion of the proton was large.

In the comparative example 2, the number of defective samples was 88 that was a large number. This is because the donor element was not added to the main component ceramic of the protective region 17, and the number of the oxygen defect was large.

In the comparative example 3, the number of defective samples was 217 that was a specific larger number. This is because: the number of paths for the diffusion intrusion of the proton was large because the average grain diameter of the main component ceramic of the protective region 17 was smaller than that of the capacity region 14; and the number of the oxygen defect was large because the donor element was not added to the main component ceramic of the protective region 17.

In the comparative example 4, the number of the defective sample was 5 that was a large number. This is because the donor element concentration in the main component ceramic of the cover sheet was the same as that of the dielectric green sheet, and the number of the oxygen defect in the protective region 17 was large.

In the example, 1, the number of the defective sample was zero. However, in the example 2, the number of the defective sample was one. From the results, it is thought that the diffusion intrusion of the proton was suppressed more because the average grain diameter of the main component ceramic of the protective region 17 was twice or more than that of the capacity region 14.

In the example 8, the number of the defective sample was zero. However, in the example 9, the number of the defective sample was three. From the results, it is thought that the diffusion intrusion of the proton was suppressed more because the donor element concentration in the protective region 17 was 0.2 atm % or more.

In the example 12, the number of the defective sample was one. However, in the example 13, the number of the defective sample was two. From the results, it is thought that the diffusion intrusion of the proton was suppressed more because the thickness of the protective region 17 was 2.0 μm or more.

In the example 1, the number of the defective sample was zero. However, in the example 12, the number of the defective sample was one. From the results, the diffusion intrusion of the proton was suppressed more because the thickness of the protective region 17 was 5.0 μm or more.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer structure in which each of a plurality of ceramic dielectric layers and each of a plurality of internal electrode layers are alternately stacked, a main component of the dielectric layer being ceramic, the multilayer structure having a rectangular parallelepiped shape, the plurality of internal electrode layers being alternately exposed to a first edge face and a second edge face of the multilayer structure, the first edge face facing with the second edge face, wherein:
   a region in which a set of internal electrode layers exposed to the first edge face of the multilayer structure face with another set of internal electrode layers exposed to the second edge face of the multilayer structure is a capacity region;

in the capacity region, a circumference region is a region around the capacity region;

at least a part of the circumference region has a protective region;

a main component ceramic of the capacity region has a perovskite structure $ABO_3$;

a main component ceramic of the protective region has the perovskite structure $ABO_3$;

an average grain diameter of the main component ceramic of the protective region is larger than that of the main component ceramic of the capacity region;

a concentration of a donor element in the main component ceramic of the protective region is larger than that of the main component ceramic of the capacity region; and the donor elements of the protective region and the capacity region are elements that can be replaced with an A site of the perovskite $ABO_3$ and can become an ion having a valence of three or elements that can be replaced with a B site of the perovskite $ABO_3$ and can become an ion having a valence of five or more.

2. The multilayer ceramic capacitor as claimed in claim 1, further comprising a cover layer that is provided at least on an upper face and a lower face of the multilayer structure in a stacking direction of the multilayer structure, a main component of the cover layer being a same as that of the dielectric layer, wherein the cover layer includes the protective region.

3. The multilayer ceramic capacitor as claimed in claim 1, wherein:

a region in which internal electrode layers coupled to the first edge face of the multilayer structure face with each other without sandwiching internal electrode layers coupled to the second edge face of the multilayer structure and another region in which internal electrode layers coupled to the second edge face of the multilayer structure face with each other without sandwiching internal electrode layers coupled to the first edge face of the multilayer structure are end margins; and at least one of the end margins includes the protective region.

4. The multilayer ceramic capacitor as claimed in claim 1, wherein:

side margins are a part of the multilayer structure;

the side margins cover edge portions to which the plurality of internal electrode layers extend toward two side faces other than the first edge face and the second edge face; and at least one of the side margins include the protective region.

5. The multilayer ceramic capacitor as claimed in claim 1, wherein the concentration of the donor element in the main component ceramic of the capacity region is 0.2 atm % or less.

6. The multilayer ceramic capacitor as claimed in claim 1, wherein a thickness of the plurality of dielectric layer is 1 µm or less.

7. The multilayer ceramic capacitor as claimed in claim 1, wherein an average grain diameter in the main component ceramic of the protective region is twice or more than that of the capacity region.

8. The multilayer ceramic capacitor as claimed in claim 1, wherein an average grain diameter in the main component ceramic of the capacity region is 300 nm or less.

9. The multilayer ceramic capacitor as claimed in claim 1, wherein the main component ceramic of the capacity region and the main component ceramic of the protective region have a perovskite structure.

10. The multilayer ceramic capacitor as claimed in claim 9, wherein the donor element is at least one of V, Mo, Nb, La, W and Ta.

11. A multilayer ceramic capacitor comprising: a multilayer structure in which each of a plurality of ceramic dielectric layers and each of a plurality of internal electrode layers are alternately stacked, a main component of the dielectric layer being ceramic, the multilayer structure having a rectangular parallelepiped shape, the plurality of internal electrode layers being alternately exposed to a first edge face and a second edge face of the multilayer structure, the first edge face facing with the second edge face, wherein:

a region in which a set of internal electrode layers exposed to the first edge face of the multilayer structure face with another set of internal electrode layers exposed to the second edge face of the multilayer structure is a capacity region;

in the capacity region, a circumference region is a region around the capacity region; at least a part of the circumference region has a protective region of which an average grain diameter of a main component ceramic is larger than that of the capacity region and of which a concentration of a donor element in the main component ceramic is larger than that of the capacity region;

a region in which internal electrode layers coupled to the first edge face of the multilayer structure face with each other without sandwiching internal electrode layers coupled to the second edge face of the multilayer structure and another region in which internal electrode layers coupled to the second edge face of the multilayer structure face with each other without sandwiching internal electrode layers coupled to the first edge face of the multilayer structure are end margins; and at least one of the end margins includes the protective region.

12. A multilayer ceramic capacitor comprising:

a multilayer structure in which each of a plurality of ceramic dielectric layers and each of a plurality of internal electrode layers are alternately stacked, a main component of the dielectric layer being ceramic, the multilayer structure having a rectangular parallelepiped shape, the plurality of internal electrode layers being alternately exposed to a first edge face and a second edge face of the multilayer structure, the first edge face facing with the second edge face, wherein:

a region in which a set of internal electrode layers exposed to the first edge face of the multilayer structure face with another set of internal electrode layers exposed to the second edge face of the multilayer structure is a capacity region;

in the capacity region, a circumference region is a region around the capacity region;

at least a part of the circumference region has a protective region of which an average grain diameter of a main component ceramic is larger than that of the capacity region and of which a concentration of a donor element in the main component ceramic is larger than that of the capacity region; and an average grain diameter in the main component ceramic of the protective region is twice or more than that of the capacity region.

* * * * *